(12) United States Patent
Haigh et al.

(10) Patent No.: US 6,525,566 B2
(45) Date of Patent: *Feb. 25, 2003

(54) ISOLATOR FOR TRANSMITTING LOGIC SIGNALS ACROSS AN ISOLATION BARRIER

(75) Inventors: Geoffrey T. Haigh, Boxford, MA (US); Baoxing Chen, Chelmsford, MA (US)

(73) Assignee: Analog Devices, Inc., Norwood, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/872,779

(22) Filed: Jun. 1, 2001

(65) Prior Publication Data

US 2002/0017919 A1 Feb. 14, 2002

Related U.S. Application Data

(63) Continuation of application No. 09/503,574, filed on Feb. 14, 2000, now Pat. No. 6,262,600.

(51) Int. Cl.[7] .......................................... H03K 19/0175
(52) U.S. Cl. .......................................... 326/82; 326/31
(58) Field of Search ................................ 326/82, 83, 86, 326/16, 26

(56) References Cited

U.S. PATENT DOCUMENTS

| 3,714,540 | A | 1/1973 | Galloway | 321/2 |
|---|---|---|---|---|
| 3,798,608 | A | 3/1974 | Huebner | 340/172.5 |
| 4,027,152 | A | 5/1977 | Brown et al. | 250/199 |
| 4,118,603 | A | 10/1978 | Kumhyr | 179/16 E |
| 4,227,045 | A | 10/1980 | Chelcun et al. | 178/66.1 |
| 4,302,807 | A | 11/1981 | Mentler | 363/134 |
| 4,748,419 | A | 5/1988 | Somerville | 330/10 |
| 4,825,450 | A | 4/1989 | Herzog | 375/17 |
| 4,835,486 | A | 5/1989 | Somerville | 330/10 |
| 4,859,877 | A | 8/1989 | Cooperman et al. | 307/443 |
| 4,885,582 | A | 12/1989 | LaBarge et al. | 341/57 |
| 4,945,264 | A | 7/1990 | Lee et al. | 307/475 |
| 5,142,432 | A | 8/1992 | Schneider | 361/91 |
| 5,204,551 | A | 4/1993 | Bjornholt | 307/265 |
| 5,384,808 | A | 1/1995 | Van Brunt et al. | 375/36 |
| 5,396,394 | A | 3/1995 | Gee | 361/58 |
| 5,533,054 | A | 7/1996 | DeAndrea et al. | 375/286 |
| 5,588,021 | A | 12/1996 | Hunt et al. | 375/211 |
| 5,596,466 | A | 1/1997 | Ochi | 361/18 |
| 5,952,849 | A | 9/1999 | Haigh | 326/82 |
| 6,124,756 | A | 9/2000 | Yaklin et al. | 326/30 |

FOREIGN PATENT DOCUMENTS

| DE | 2529296 | 1/1977 |
|---|---|---|
| EP | 0 282 102 | 9/1988 |
| FR | 2 679 670 | 1/1993 |

OTHER PUBLICATIONS

Burr–Brown, 1993, ISO150, "Dual, Isolated, Bi–Directional DigitalCoupler".

Primary Examiner—Don Le
(74) Attorney, Agent, or Firm—Hale and Dorr LLP

(57) ABSTRACT

A logic isolation circuit has a transmitter circuit for receiving a logic input signal and providing a periodic signal to an isolation barrier, and a receiving circuit for receiving the periodic signal from the isolation barrier and for providing an output signal that indicates the transitions in the logical input signal.

41 Claims, 7 Drawing Sheets

ISOLATOR FOR TRANSMITTING LOGIC SIGNALS ACROSS AN ISOLATION BARRIER

This application is a continuation of Ser. No. 09/503,574 filed Feb. 14, 2000, now U.S. Pat. No. 6,262,600.

BACKGROUND OF THE INVENTION

This invention relates to a logic isolator for transmitting digital logical signals across an isolation barrier.

A logic isolator is a device or circuit for transmitting status or control signals across an isolation barrier from a sending side to a receiving side. The two sides are electronically isolated such that transient signals do not inadvertently trigger erroneous status or control information. U.S. Pat. No. 5,952,849, which is commonly assigned with the present application and is expressly incorporated by reference herein, shows circuitry for providing such isolation with a transformer as the barrier. Other barriers that are used include capacitors or optical devices.

In a logic isolator, when a signal is received having a low to high transition and then a high to low transition, the system can transmit across the barrier either a signal that is essentially the same as the signal that is received on the input side; alternatively, using two lines through a flip-flop, it can transmit a pulse on one line indicating a low to high transition, and a pulse on the other line indicating a high to low transition. The use of such pulses are shown, for example, in the incorporated patent.

The incorporated patent also shows the use of refresh pulses to indicate a current state of the logic line in addition to the changes in the state. This feature is useful because a logic line could be in one state for an extended period of time, and thus the refresh pulse tells the receiving side the state so the receiving side can distinguish no change from an error in the system.

SUMMARY OF THE INVENTION

A logic isolator has an input for providing a logic signal, an isolation barrier, transmitter circuit for transmitting to the isolation barrier a signal indicating changes from one state to another in the logic signal, and a receiver circuit for receiving from the isolation barrier the signal indicating changes in the state and providing an output signal indicating changes in the logic signal. The output signal may also indicate the state of the logic signal. The transmitter circuit receives logical transitions and provides a periodic signal across the isolation barrier. The receiver circuit then receives these periodic signals and converts them to transitions as provided at the input.

The periodic signal can be provided as a short burst that indicates that a transition in state has appeared. Alternatively, the periodic signal can be provided in a continuous manner, thus indicating both changes in the state and the state of the logic signal itself. The system preferably uses two separate lines and barriers so that, in the burst embodiment, the presence of the periodic signal on one line indicates a low to high transition, and on the other line indicates a high to low transition; in the continuous embodiment, a continuous periodic signal on one line indicates a high state, and on the other line indicates a low state.

The isolation barrier preferably includes a transformer, which may or may not be shielded, although the isolation barrier could employ some other method, such as capacitive coupling.

The invention also includes methods for transmitting logic signals across an isolation barrier, including converting a transition in a logic signal to a periodic signal, transmitting the periodic signal across an isolation barrier, receiving the periodic signal from the isolation barrier in a receiving circuit, and converting that periodic signal to a logical transition. The transmitting and converting processes may be with a short periodic signal that indicates a transition in the signal or a longer signal that continuously indicates the state of the signal.

In the burst mode of operation, refresh pulses can be provided as described in the incorporated patent to periodically indicate the state of the logic signal. In the continuous mode, refresh signals are not required because the periodic signal continuously indicates the state of the logic signal. The device preferably also includes detection circuitry for indicating when there has been a disconnection across the barrier, in particular to distinguish an intentionally high or low state, and the loss of a connection.

A continuous signal can also be provided through frequency modulation and demodulation, whereby an oscillator transmits to the isolation barrier a first frequency for a first state and a second frequency for a second state. A receiver circuit includes a frequency discriminator to determine the state from the signal received from the isolation barrier.

Other features and advantages will become apparent from the following description of preferred embodiments, drawings, and claims.

DESCRIPTION OF PREFERRED EMBODIMENTS

Figure 1:
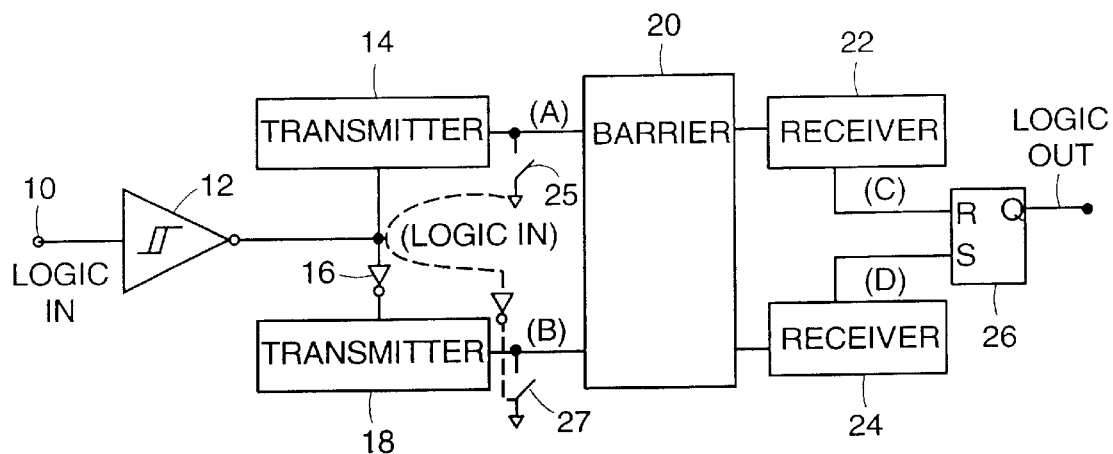
FIG. 1 is a block diagram of a logic isolator circuit.
Figure 2:
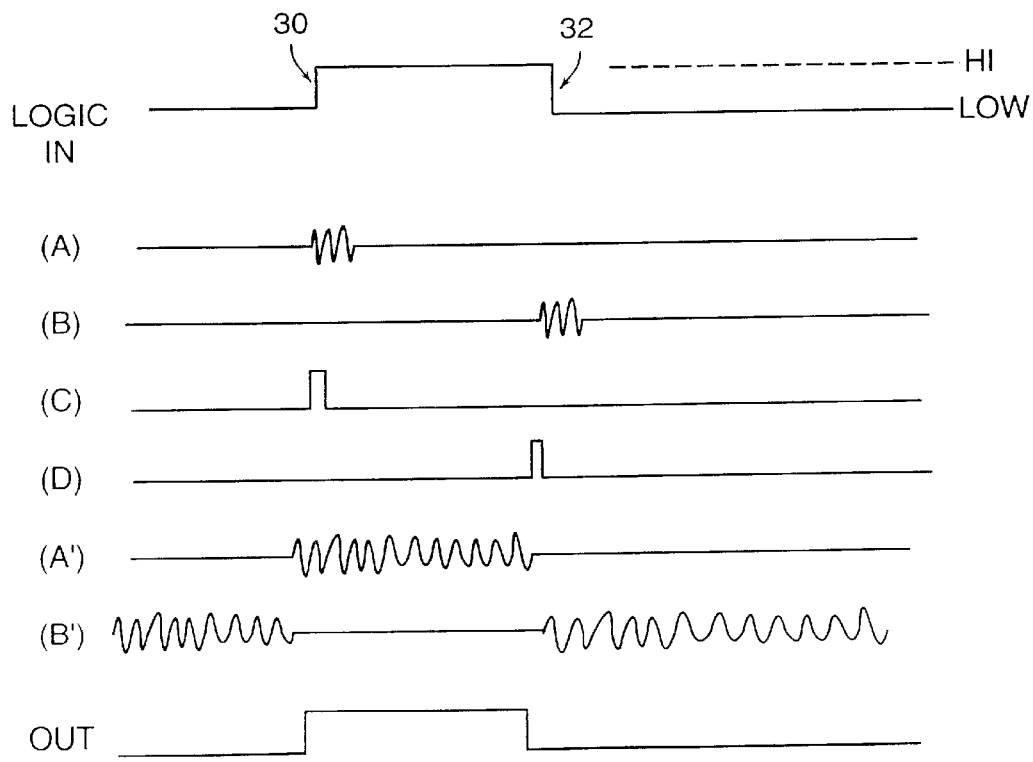
FIG. 2 is a set of waveforms showing the conversion of the transitions to a periodic signal in a burst mode and a continuous mode.

Referring to FIGS. 1 and 2, input signal 10 is provided to a Schmitt trigger 12 to produce an input signal LOGIC IN. LOGIC IN is provided to a first transmitter circuit 14 and through an inverter 16 to a second transmitter circuit 18. Transmitter circuits 14 and 18 each provide a signal across an isolation barrier 20 to a respective receiver 22 and 24. The receivers each provide an output to one of two inputs of a flip-flop 26, the output of which is a logic output signal that indicates transitions in the LOGIC IN signal.

Referring also to FIG. 2, LOGIC IN is shown with a low to high transition 30 and a high to low transition 32. In one embodiment referred to here as the burst mode, transition 30 is converted by transmitter circuit 14 to a short periodic burst as shown on signal (A), and transmitter circuit 18 converts transition 32 into a short burst as shown in signal (B). After being transmitted across barrier 20, receiver circuits 22 and 24 convert these burst signals into pulses as indicated by signals (C) and (D). These pulses are provided to the set and reset terminals of the flip-flop to produce a logic signal that is essentially the same as LOGIC IN. Refresh pulse circuitry such as that shown in the incorporated patent could be added to the transmitter circuitry so that pulses are sent on signals (C) and (D) when the signal is high and low, respectively, e.g., at 3 to 4 microsecond intervals.

In another embodiment referred to here as the continuous mode, the transmitter circuits provide a continuous periodic signal indicating the state of LOGIC IN. Thus, signal (A') has a continuous periodic signal when LOGIC IN is high, and signal (B') has a continuous periodic signal when LOGIC IN is low. The continuous mode thus indicates not only transitions but also the state at any given time, such that the output can be corrected very quickly, e.g., in 1 nanosecond.

Barrier 20 can include coils, and electromagnetic immunity is provided by switches 25 and 27, which short out the respective windings when not transmitting data.

Figure 3:
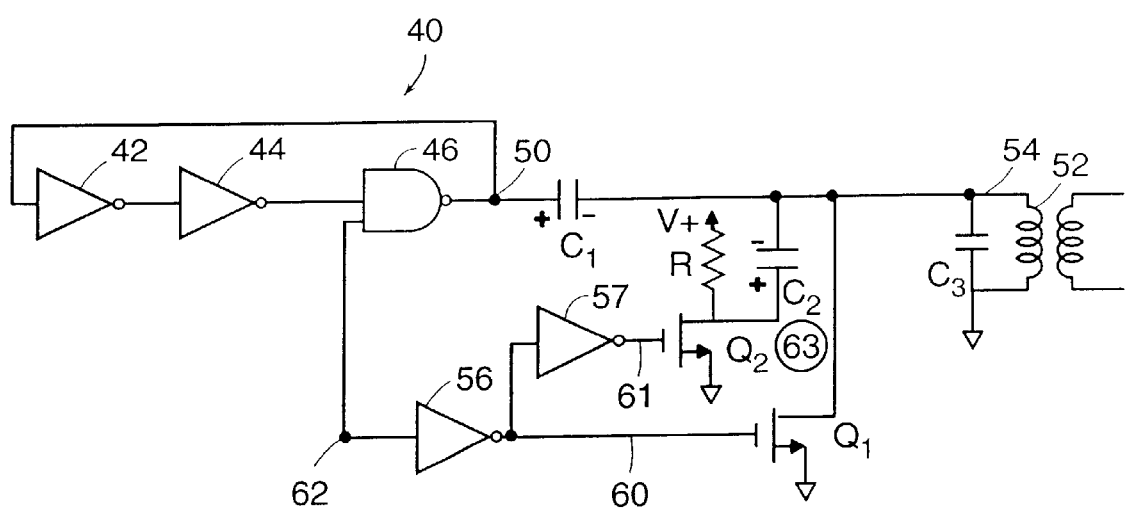
FIGS. 3 and 3A are a schematic of a transmitter and a waveform diagram.

Referring to FIG. 3, an embodiment of a transmitter 14 or 18 is shown. Transmitter circuit 14 has a ring oscillator 40 with inverters 42, 44 and NAND gate 46. With an odd number of inverting logic gates connected in a ring, when an input signal is provided to the NAND gate from node 62, the output signal at node 50 will be a periodic signal, with a transition from high to low in the periodic signal equal to the sum of the propagation delays through inverters 42, 44 and NAND gate 46, and thus the period of the signal is twice that sum.

Figure 3A:
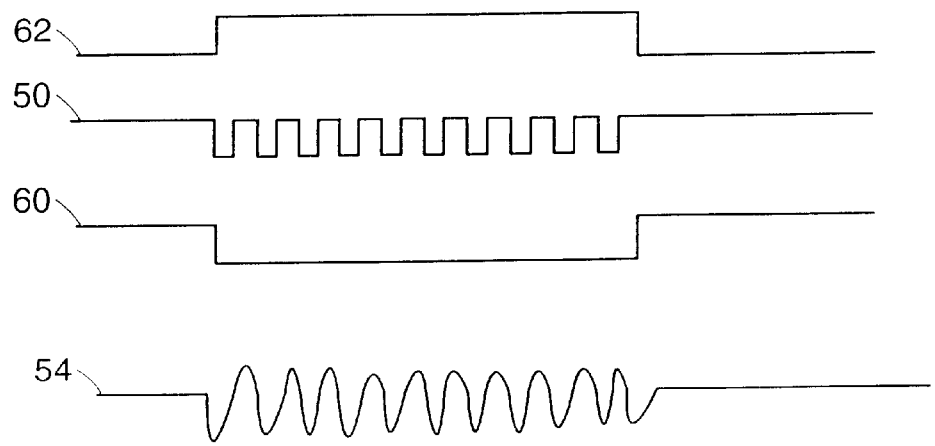

Referring also to FIG. 3A, LOGIC IN is provided through an inverter 56 to the control terminal of a transistor Q1 at node 60. When LOGIC IN is low, transistor Q1 is turned on, thereby shunting the signal at node 54 and providing a low output.

The signal on node 60 is also provided to another inverter 57 and to a control terminal of transistor Q2. When LOGIC IN is low, node 61 is low, and transistor Q2 is off. Node 63 is thus high through its coupling to a supply rail through resistor R. Capacitors C1 and C2 are thus each charged, capacitor C1 through NAND gate 46, and capacitor C2 through the voltage supply with node 54 provided through transistor Q1.

When LOGIC IN goes high and transistor Q1 shuts off, capacitors C1, C2, and C3 are all discharged through a coil 52, which is part of the isolation barrier.

As shown in FIG. 3A, LOGIC IN is shown as a signal with a low to high transition and a high to low transition. The signal on node 50 is high (when LOGIC IN is high, and it oscillates when LOGIC IN is low. The signal on node 63 is transferred to the coil in response to the low to high transition in LOGIC IN. On the high to low transition, the turning on of transistor Q1 produces a fast shut-off.

The circuit of FIG. 3 will thus provide a continuous periodic signal during the time that LOGIC IN is high. At the same time, as indicated in FIG. 1, an inverted signal is provided to another transmitter that provides a continuous periodic signal when LOGIC IN is low using essentially the same circuitry. The signal that is provided to the isolation barrier is thus of the continuous mode type as shown in signals A' and B' of FIG. 2. Inverter 16 (FIG. 1) uses non-overlap timing to prevent both signals from being high at the same time.

To convert the circuit of FIG. 2 from one for use in the continuous mode to one for use in the burst mode (as shown with signals A and B of FIG. 2), a monostable multivibrator (known as a "one-shot") is inserted at node 62. A one-shot detects an edge of a signal and outputs a pulse with a width set by the circuitry of the one-shot. With a one-shot, in response to a transition edge, the signal provided to node 48, capacitor C2, and transistor Q1 is a pulse instead of a continuous level until the state changes. Consequently, the periodic signal is a burst of a periodic signal for some period. The width of the pulse from the one-shot should be sufficiently long so that several cycles of the periodic signal are transmitted to the isolation barrier, e.g., three to five cycles at 1.1 GHz.

The coils can be formed on a chip as 2×4 micron copper, about 20 to 25 nHy, with high Q and self-resonant frequencies in a range of about 300 MHz to 1.5 GHz. The secondaries can be formed on a chip with an electrostatic (Faraday) shield over the secondaries and the primaries over the shield. The shield provides high transient voltage immunity. The circuitry can thus be provided as a structure as shown in WO99/21332, with the GMR replaced by two coils, or with the coils and GMR replaced with four capacitor plates.

Figure 4:
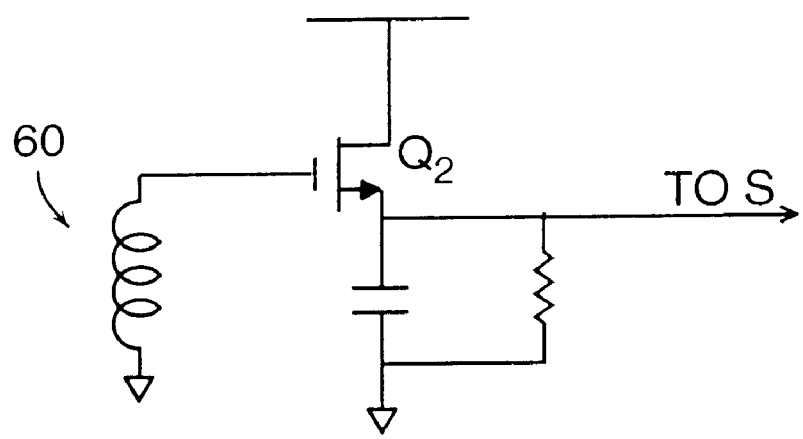
FIGS. 4 and 5, and 4A and 5A, are schematics of receiver circuits and waveform diagrams.
Figure 5:
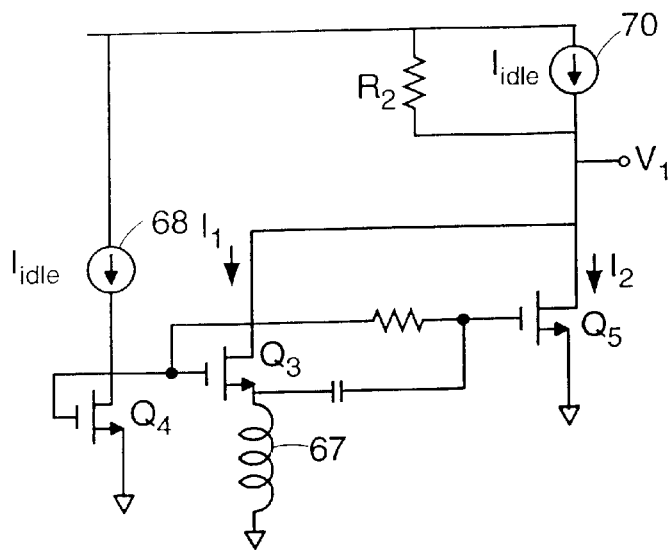

Alternative receiver circuits are shown in FIGS. 4 and 5, with the receiver circuit of FIG. 4 being adapted for use with the burst mode of operation, and the receiver circuit of FIG. 5 for use with the continuous mode. The two circuits have in common that each receives a periodic signal and rectifies it in some manner.

Referring to FIG. 4, coil 60 receives the induced signal from coil 52 (FIG. 3). That periodic signal on coil 60 is provided to a source follower transistor Q2 with a drain coupled to a supply rail and a source coupled to an RC circuit that rectifies the periodic signal.

Figure 4A:
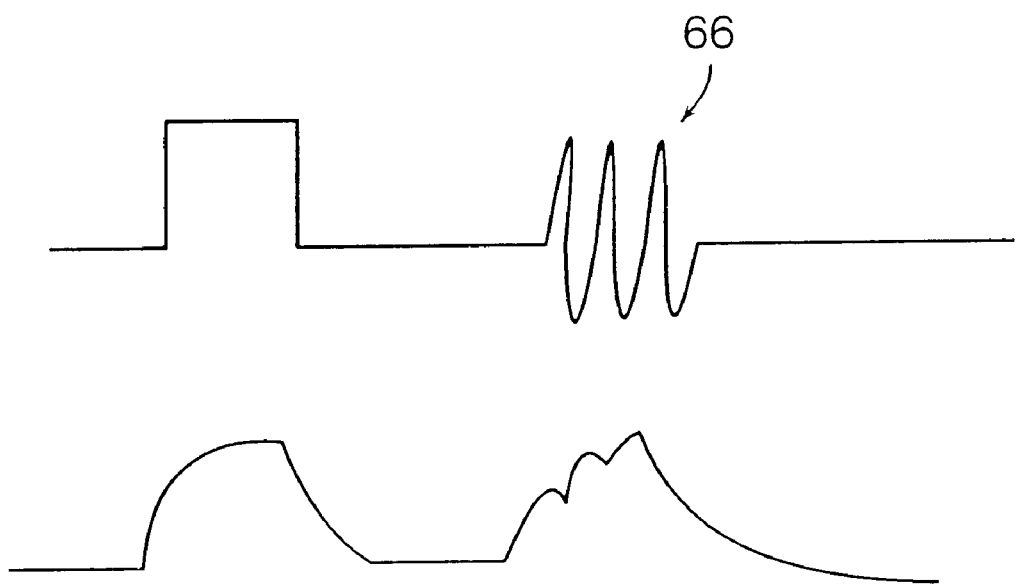

Referring also to FIG. 4A, an input and resulting output are shown with a short burst of a periodic signal. A pulse is also shown for comparison and for explanation. If a pulse is input into transistor Q2, on the leading edge of the pulse, the capacitor is charged until the pulse goes low, at which time the voltage on the capacitor decays with a time constant that is a function of the resistance and capacitance of the RC circuit. Similarly with a burst 66 of the periodic signal, the capacitor is charged until the signal goes negative, at which time the capacitor is discharged. Because the periodic signal has sufficiently high frequency relative to the RC time constant, the capacitor does not have sufficient time to discharge, and thus the resulting output is similar to that from a pulse. The output from the RC circuit can also be coupled to a Schmitt trigger.

As indicated in FIG. 1, there would typically be two such receivers which may be coupled to a flip-flop such that the set and reset of the flip-flop would indicate either a low to high or high to low transition.

Referring to FIG. 5, a receiver circuit is shown for the continuous mode of transmitting a periodic signal across an isolation barrier. In this circuit, a receiver coil 67 is connected to the source of transistor Q3. A current mirror including a current source 68 and transistors Q4 (which acts as a resistor) causes a small current (e.g., 100 uA) referred to as the "idle current" from current source 70 to be provided to the drains of each of transistors Q3 and Q5. Transistors Q3 and Q5, when turned on by a high gate voltage, produces a current much larger than the idle current, e.g., 1 mA, referred to as the peak current. The specific values for the idle current and peak current are not significant, but there should be a fairly large difference in them, such as one order of magnitude. When the signal on coil 67 is at zero in a quiescent state (e.g., the logic level is continuously low, transistors Q3 an Q5 each conduct half of the idle current. Because there is little current, at this point, there is little voltage drop across resistor R2, so the voltage at V1 is high.

Figure 5A:
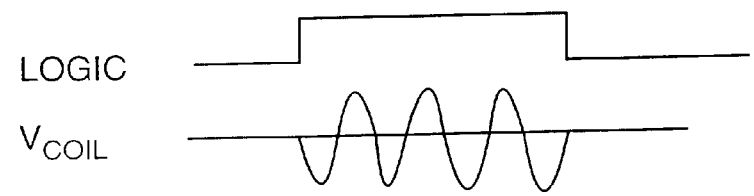
Figure 5A:
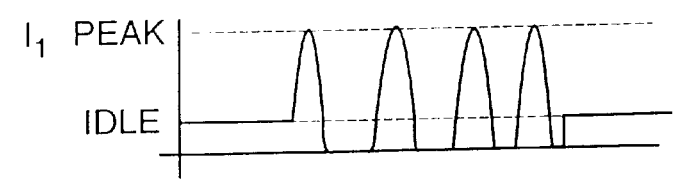
Figure 5A:
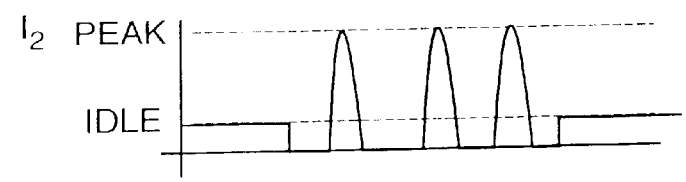
Figure 5A:
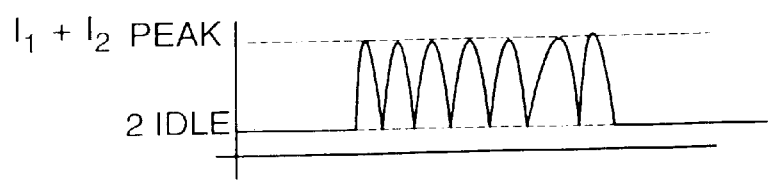

Referring also to FIG. 5A, when the logic signal goes high, there is a periodic signal on coil 67. As the signal on coil 67 goes high, transistor Q3 only conducts the idle current, but transistor Q5 conducts the peak current as shown in current I2 in FIG. 5A). As the voltage on coil 67 goes down, the current on transistor Q5 declines and the current on transistor Q3 increases to the peak current as shown in current I1. The sum of I1 and I2 produce a full wave rectified current. When this current is high, there is a significant drop across resistor R2, so the voltage at V1 is low.

A substantially identical circuit with an inverted input is provided for a second coil to produce a corresponding output signal V2, where V2 is high when the logic signal is high, and V2 is low when the logic signal is low (inverse of V1).

Figure 6:
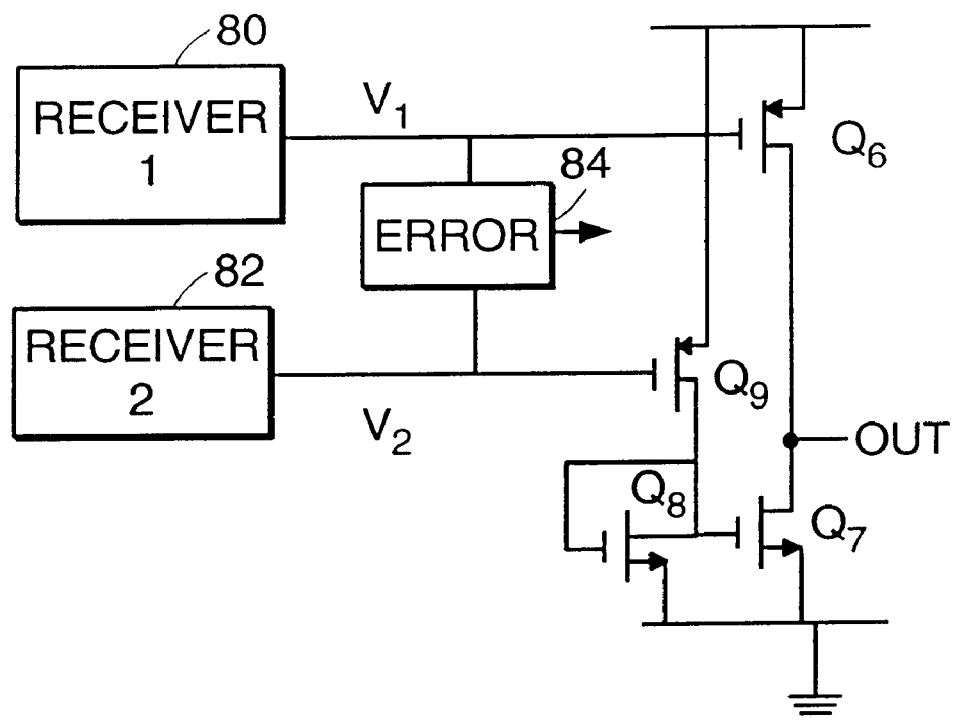
FIG. 6 is a schematic of the output of two receivers and error detection circuitry.

Referring to FIG. 6, the receiving circuitry of FIG. 5 is shown with a pair of receivers of the type shown in FIG. 5 with error detection circuitry. Receivers 80 and 82 are each connected to a coil (not shown). As indicated above, when the logic signal received is low, V1 is high and V2 is low. Transistor Q6 is thus off, transistor Q9 is on, causing current to conduct through transistor Q8 (which serves as a resistor), causing transistor Q7 to conduct, and thus causing the signal OUT to go low. Similarly, when the received logic signal is high, V1 is low and V2 is high, causing Q6 to be turned on, Q7 to be turned off, and OUT to be high. The circuit can also include a Schmitt trigger after OUT.

Voltages V1 and V2 should always have one high and one low. Error detection circuitry 84 is provided to monitor these voltages. If both voltages go low, an error signal is produced to indicate that the output is not reliable.

Figure 7:
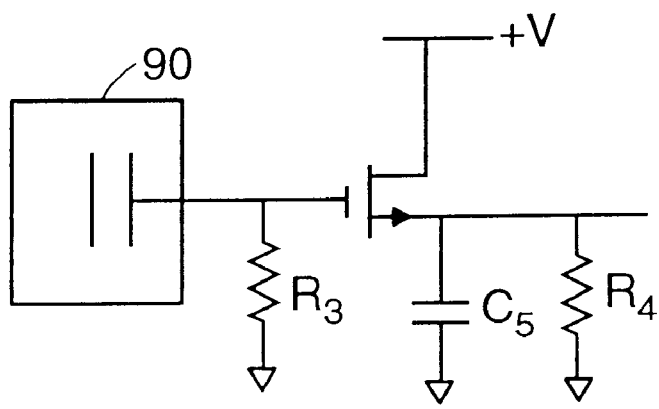
FIG. 7 is a schematic of a receiver with a capacitively coupled isolation barrier.

The system has thus far been shown in the embodiments with sets of coils as the isolation barrier, but other isolation approaches can be used. As shown, for example, in FIG. 7, a periodic signal can be provided when the isolation barrier is capacitively coupled as represented by barrier 90. The circuit of FIG. 7 is similar to the circuit of FIG. 4, except that a large resistor R3 is coupled from the control terminal of the transistor to ground. As with the previous embodiment, the source follower transistor and RC circuit of capacitor C5 and resistor R4 rectifies the periodic signal provided by the capacitor plates.

Figure 8:
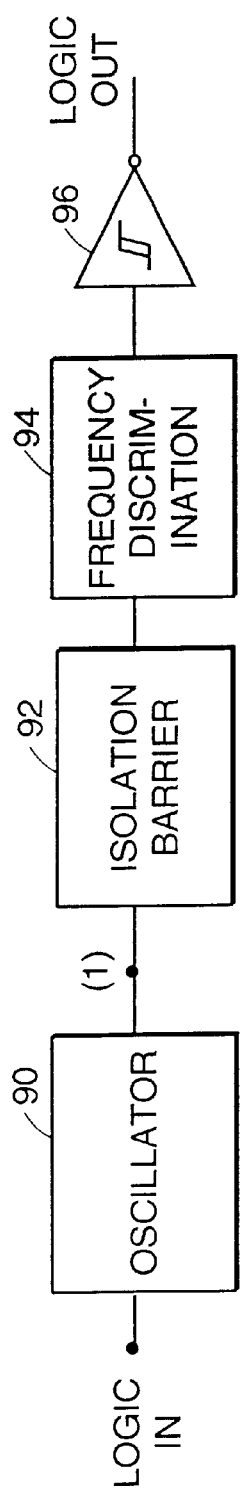
FIGS. 8 and 8A are a schematic and a waveform diagram of a system that uses frequency modulation and demodulation across a barrier.
Figure 8A:
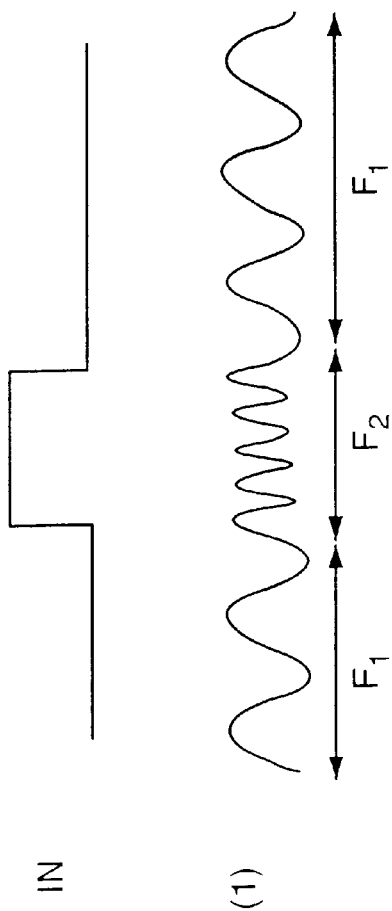

Referring to FIG. 8, in another embodiment, a logic isolation system uses frequency modulation and demodulation. An input signal LOGIC IN is provided to an oscillator 90, such as a Colpits oscillator. Referring also to FIG. 8A, when the logic signal is low, the oscillator produces a signal with a frequency f1, and when the logic signal is high, the oscillator produces a signal with a frequency f2 (shown greater than f1, but it need not be). The signal is transmitted across isolation barrier 92 to a frequency discriminator 94, such as a Foster-Seeley detector of the type used in the radio receiving field. Discriminator 94 provides a high or low output depending on whether the signal is at f1 or f2. The resulting output is provided to a Schmitt trigger 96.

Figure 9:
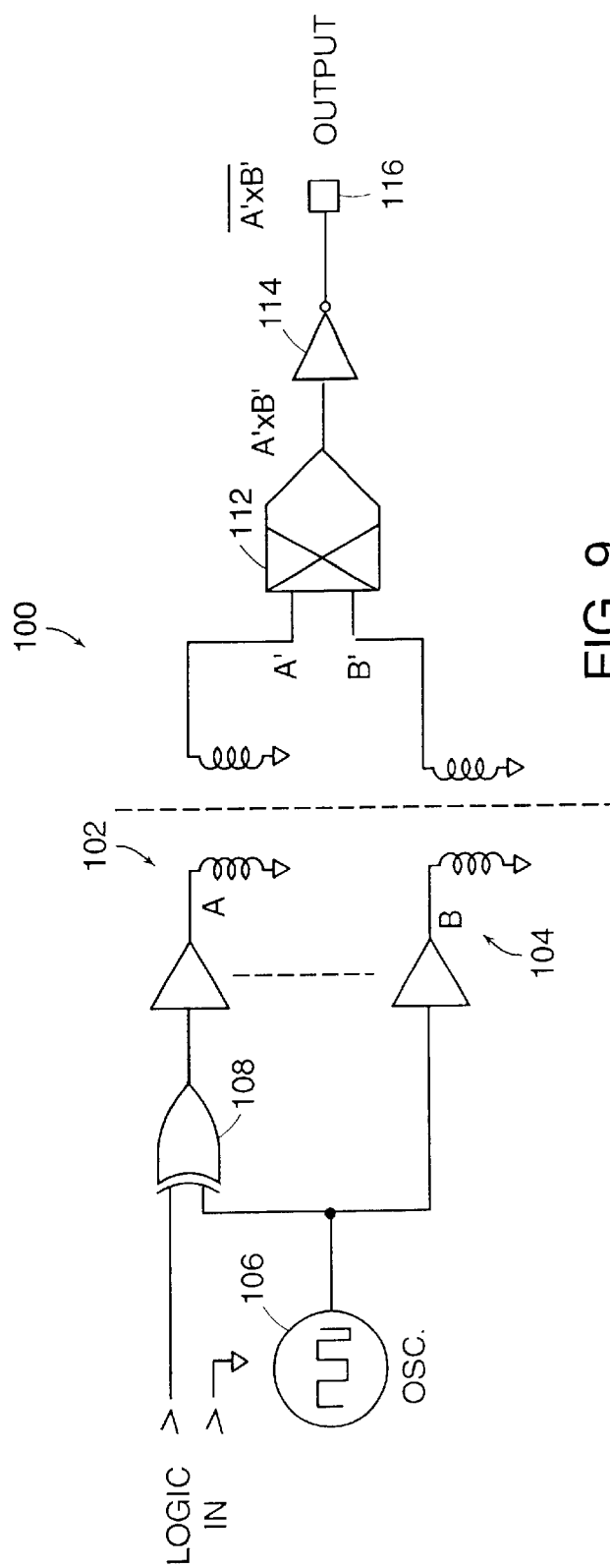
FIGS. 9 and 9A are a schematic and a waveform diagram of a phase modulated isolator.

FIG. 9 shows a logic isolator 100 that uses phase modulation. The isolator has a first coil and driver 102 and a second coil and driver 104. The input to the second coil and driver is provided by an oscillating signal from an oscillator 106. The oscillating signal and the logic input signal LOGIC IN are provided to an XOR gate 108 and then to the driver for the first coil.

Figure 9A:
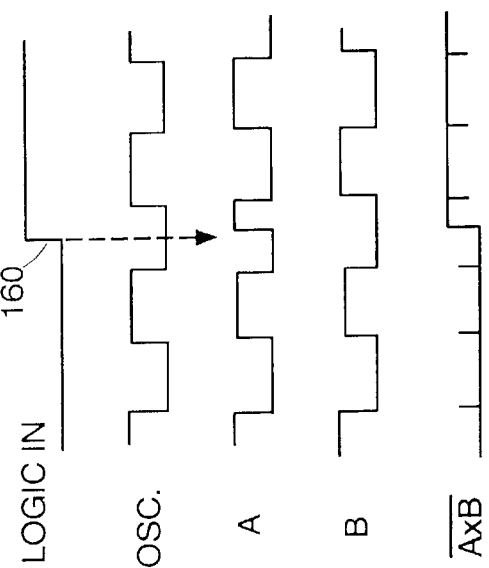

Referring also to FIG. 9A, when LOGIC IN is low, the oscillating signal, the signal on the first coil, and the signal on the second coil are all in phase. In response to a transition 110 from low to high, the signal on the first coil goes from low to high and thereafter the signals on the first and second coils are out of phase with each other.

Referring again to FIG. 9, on the receiving side, first and second receiving coils are provided to a multiplier 112 and then to an inverter 114 to an output 116. Multiplier 112 yields a positive value when the signal on the coils are in phase, and an inverse signal when the signals on the coils are in antiphase. As a result, the signal at output 116 indicates the value of LOGIC IN. Because the signals are continuously transmitted, the state is constantly refreshed.

Having described certain preferred embodiments, it should be apparent that modifications can be made without departing from the scope of the invention as defined by the appended claims. While only one channel is shown, the device could have multiple channels together in one device for control and/or status signals as shown in the incorporated patent. The circuitry can be formed from discrete components, or it can be integrated onto one or more semiconductor substrates, along with the isolation barrier itself.

What is claimed is:

1. A method for transmitting a status or control logic signal across an isolation barrier comprising:

receiving the status or control logic signal, the logic signal including a first transition from a first state to a second state and a second transition from the second state to the first state;

a transmitter system including a first transmitter and a second transmitter for transmitting to the isolation barrier separate first and second signals that are representative of first and second transitions; and a receiver system receiving from the isolation barrier the first and second signals, the receiving system includes a first receiver that receives signals from the first transmitter, a second receiver that receives signals from the second transmitter, and a bistable device, the first and second receivers providing signals indicating the occurrence of first and second transitions to the bistable device for providing an output signal based on the logic signal.

2. The method of claim 1, wherein the first signal has a change in response to the first transition and the second signal has a change in response to the second transition.

3. The method of claim 1, wherein the first signal is a continuous periodic signal with multiple periods beginning when the logic signal has the first transition and ending when the logic signal has the second transition, the continuous periodic signal thereby further indicating that the logic signal is in the second state.

4. The method of claim 3, wherein the second signal is a continuous periodic signal beginning when the logic signal has the second transition and ending when the logic signal has the first transition, the continuous periodic signal thereby further indicating that the logic signal is in the first state.

5. The method of claim 4, wherein the first signal is in a quiescent state during times when the second signal is a continuous periodic signal, and the second signal is in a quiescent state during times when the first signal is a continuous periodic signal.

6. The method of claim 1, wherein the first transmitter transmits a periodic signal with multiple periods in a short burst to indicate the first transition, and the second transmitter transmits a periodic signal with multiple periods in a short burst to indicate the second transition.

7. The method of claim 1, wherein transmitting to the isolation barrier includes transmitting to first and second sets of coils for coupling the signals.

8. The method of claim 1, wherein transmitting to the isolation barrier includes transmitting to first and second sets of capacitor plates.

9. The method of claim 1, wherein the transmitter system includes an inverter for receiving the control or logic signal, wherein the logic signal is provided to the first transmitter, and an inverted logic signal is provided to the second transmitter.

10. The method of claim 1, wherein the bistable device includes a flip-flop.

11. The method of claim 1, wherein the first and second transmitters are substantially identical.

12. The method claim 11, wherein the first and second receivers are substantially identical.

13. The method of claim 1, wherein the first and second receivers are substantially identical.

14. A method for transmitting a status or control logic signal across an isolation barrier comprising:
   receiving the status or control logic signal, the logic signal including a first transition from a first state to a second state and a second transition from the second state to the first state;
   a transmitter system transmitting to the isolation barrier separate first and second signals that are representative of first and second transitions, the transmitter system includes a first transmitter and a second transmitter; and
   a receiver system receiving from the isolation barrier the first and second signals, the receiving system includes a first receiver that receives signals from the first transmitter and a second receiver that receives signals from the second transmitter, the receiver system using the first and second signal to provide an output signal indicating the occurrence of first and second transitions; and
   monitoring the first and second receivers and providing an error signal if the first and second receivers produce the same signals.

15. The method of claim 14, wherein the signals from the first and second receivers are provided to an output stage that provides the output signal.

16. The method of claim 14, wherein the first signal is a continuous periodic signal with multiple periods beginning when the logic signal has the first transition and ending when the logic signal has the second transition, the continuous periodic signal thereby further indicating that the logic signal is in the second state.

17. The method of claim 16, wherein the second signal is a continuous periodic signal beginning when the logic signal has the second transition and ending when the logic signal has the first transition, the continuous periodic signal thereby further indicating that the logic signal is in the first state.

18. The method of claim 17, wherein the first signal is in a quiescent state during times when the second signal is a continuous periodic signal, and the second signal is in a quiescent state during times when the first signal is a continuous periodic signal.

19. A logic isolator circuit comprising:
   an isolation barrier;
   a transmitter circuit receiving a control or status logic signal with logical transitions between a first state to a second state, the transmitter circuit providing to the isolation barrier separate first and second signals indicative of transitions;
   a receiver circuit including a first receiver and a second receiver for receiving from the isolation barrier the first and second signals; and
   an output coupled to the receiver circuit for providing an output status or control signal that indicates the logical transitions of the control or status logic signal received by the transmitter circuit, the output including a bistable device coupled to receive signals from the first and second receivers.

20. The circuit of claim 19, wherein the transmitter circuit includes a first transmitter, a second transmitter, and an inverter, the inverter for inverting the logic signal, the first transmitter for receiving the logic signal and the second transmitter for receiving the inverted logic signal.

21. The circuit of claim 20, wherein one of the first and second transmitter circuits transmits a periodic burst signal with multiple periods in response to receiving a transition.

22. The circuit of claim 21, wherein the other of the first and second transmitter circuits provides a quiescent signal while the one of the first and second transmitter circuits transmits the periodic signal.

23. The circuit of claim 20, wherein one of the first and second transmitters begins to transmit a periodic signal in response to receiving a transition in the logic signal and then continues to transmit the periodic signal as long as the logic signal is in a same state that it was after the transition.

24. The circuit of claim 23, wherein the other of the first and second transmitters circuits provides a quiescent signal while the one of the first and second transmitters transmits the periodic signal.

25. The circuit of claim 19, wherein the isolation barrier includes one or more sets of coils.

26. The circuit of claim 19, wherein the isolation barrier includes one or more sets of capacitor plates.

27. The circuit of claim 19, further comprising a monitoring circuit for monitoring the first and second receivers and providing an error signal if the first and second receivers produce the same output.

28. The circuit of claim 19, wherein the first and second transmitters are substantially identical.

29. The circuit of claim 19, wherein the first and second receivers are substantially identical.

30. A method for transmitting a status or control logic signal across an isolation barrier comprising:
   receiving the status or control logic signal, the logic signal including a first transition from a first state to a second state and a second transition from the second state to the first state;
   a transmitter system transmitting to the isolation barrier a periodic signal with multiple periods in a short burst to indicate the first transition; and
   a receiver system receiving from the isolation barrier the periodic signal and using the periodic signal to provide an output signal indicating the occurrence of the first transitions.

31. The method of claim 30, wherein the transmitter system transmits separate first and second signals that are representative of first and second transitions, the transmitter system includes a first transmitter and a second transmitter.

32. The method of claim 31, wherein the receiver system receives the first and second signals, the receiving system includes a first receiver that receives signals from the first transmitter and a second receiver that receives signals from the second transmitter.

33. A circuit for transmitting a logic signal across an isolation barrier comprising a transmitter for receiving a control or status logic signal that includes a first transition from a first state to a second state and a second transition from the second state to the first state and for transmitting signals indicative of the transitions, the transmitter including a first transmitter, a second transmitter, and an inverter for providing the logic signal to the first transmitter, and the inverted logic signal to the second transmitter.

34. The circuit method of claim 33, wherein the transmitters each transmit a periodic signal in response to a transition in the logic signal.

35. A logic isolation system comprsing:
   a chip including a substrate;
   an isolation barrier including coils formed on the chip;
   a transmitter for receiving a control or status logic signal that includes a first transition from a first state to a second state and a second transition from the second state to the first state, the transmitter transmitting to the isolation barrier periodic signals indicative of the transitions; and
   a receiver for receiving periodic signals from the isolation barrier and using the periodic signals to provide an output signal indicating the transitions.

36. The circuit of claim 35, wherein the transmitter circuit includes a first transmitter, a second transmitter, and an inverter, the inverter for inverting the logic signal, the first transmitter for receiving the logic signal and the second transmitter for receiving the inverted logic signal.

37. The circuit of claim 36, wherein one of the first and second transmitter circuits transmits a periodic burst signal with multiple periods in response to receiving a transition.

38. The circuit of claim 36, wherein one he first and second transmitter circuits provides a quiescent signal while the other of the first and second transmitter circuits transmits the periodic signal.

39. The circuit of claim 35, wherein the signals transmitted by the transmitter are periodic signals.

40. The circuit of claim 35, wherein the signals received by the receiver are periodic signals.

41. The circuit of claim 35, wherein the transmitter and receiver are each formed on the chip.

* * * * *